May 19, 1936.    E. S. CORNELL, JR    2,041,653
MAXIMUM TEMPERATURE CONTROLLING DEVICE
Filed May 11, 1934    2 Sheets-Sheet 1
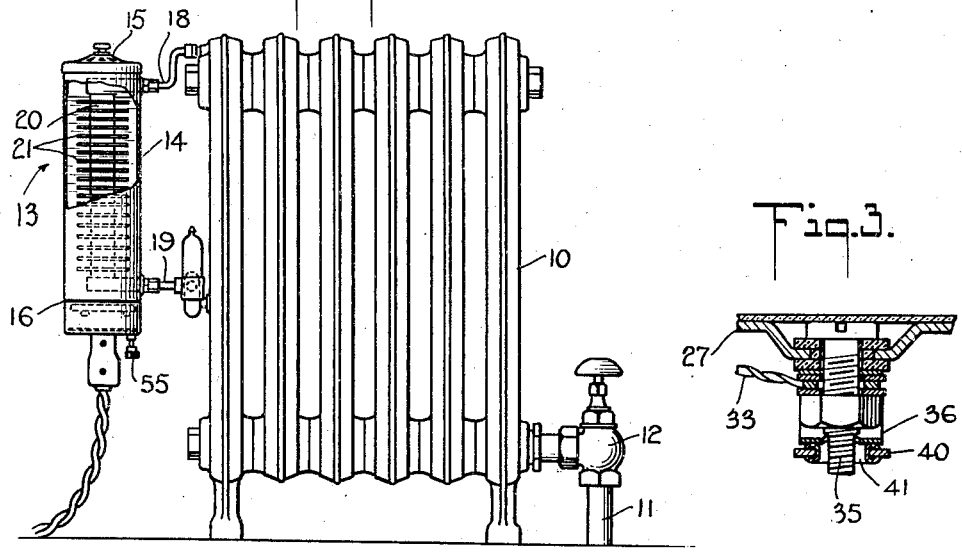
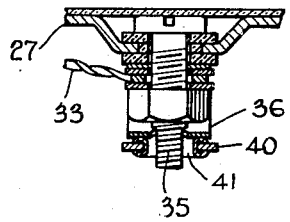
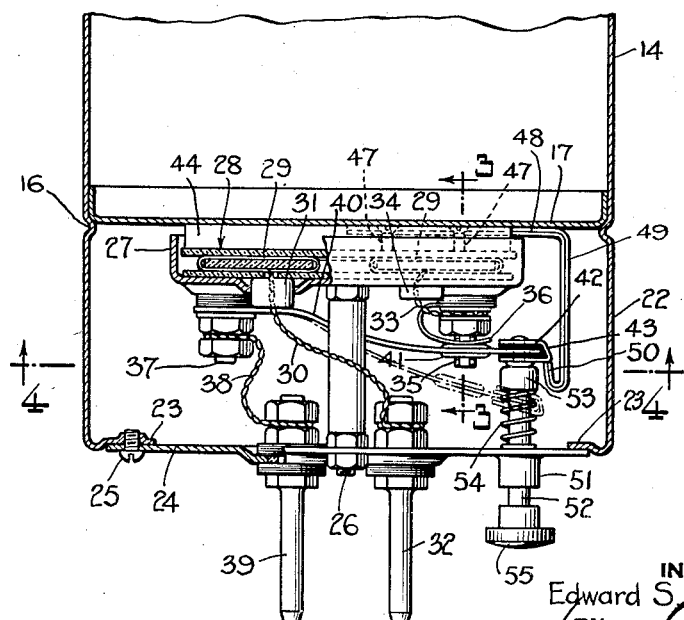
INVENTOR
Edward S. Cornell Jr.
BY
Henry J. Luke
HIS ATTORNEY May 19, 1936.  E. S. CORNELL, JR  2,041,653
MAXIMUM TEMPERATURE CONTROLLING DEVICE
Filed May 11, 1934  2 Sheets-Sheet 2

INVENTOR
Edward S. Cornell, Jr.
BY
HIS ATTORNEY

Patented May 19, 1936

2,041,653

UNITED STATES PATENT OFFICE 2,041,653

MAXIMUM TEMPERATURE CONTROLLING DEVICE

Edward S. Cornell, Jr., Larchmont, N. Y., assignor to American Radiator Company, New York, N. Y., a corporation of New Jersey Application May 11, 1934, Serial No. 725,034

2 Claims. (Cl. 219—38)

My invention relates to maximum temperature controlling devices.

Generally, my invention relates to an improved maximum temperature control device, effective under the condition of the temperature attaining a predetermined value, whereby the heating element engendering the temperature condition is rendered non-operative.

My invention is particularly adapted for cooperation with electrically heating elements.

Special applicability of my invention has been had commercially in combination with humidifying units, and particularly my humidifying unit set forth and described in my copending application, Serial No. 658,901, filed February 28th, 1933, entitled Humidifying device.

The most preferred forms of my invention embody a switch member normally in circuit-closing position and retained in such circuit-closing position by a thermostatic element responsive to temperature conditions engendered by an electrical heating element serving to supply heat to the humidifier, for evaporating water contained in the humidifier. Pursuant to my invention, upon the attainment of a predetermined temperature to which the stated thermostatic element is adjusted, the stated switch member is released or moved from its circuit-closing position to its circuit-opening position, thereby interrupting the circuit through the heating element, and rendering the same non-operative.

The most preferred forms of my invention embody an electrically insulating means interposed between the thermostatic element and the switch member, thus providing for electrical insulation of the thermostatic element at all stages of operation, thereby insuring the responsiveness of the thermostatic element solely to temperature conditions sought to be controlled and unaffected by heat energy engendered by the conduct of electrical current through the thermostatic element per se.

As is set forth in my aforesaid copending application, the preferred forms of my humidifying unit embody a heater unit, as in the form of a heater coil, communicatively connected with the interior of a radiator, as of the hot water or steam type, or like heating system, the stated electrical heating element being employed as an auxiliary heating means in the circumstance of absence of heat supply by the radiator or of insufficient supply of heat by the radiator to vaporize the required amount of water for the desired humidifying purposes.

Under the condition of depletion of water within the humidifying unit, that is, the absence of water, in whole or part, and consequent undue elevation of temperature my maximum temperature control device effects the opening of the circuit of the heating element, thus safeguarding the electrical heating element and the humidifying device or other therewith associated device.

Coordinated with such automatic circuit opening means, I further provide suitable means for resetting manually the switch member to circuit-closing position, whereby the thermostatic element is returned to its position effecting circuit-closure of the switch member. Applied to a humidifying device, the resetting of the thermostatic element and the switch member is appropriate upon replenishment of water in the humidifier.

Obviously, my invention is applicable for use in connection with a humidifying unit equipped with an electrical heating element independently of the supply of heat from a radiator.

My invention is similarly applicable for use in association with other types of units or devices employing water or other vaporizable fluid, whereby under the condition of the predetermined temperature, the electrical or other heating element is rendered non-operative.

My invention also embodies suitable means for manually resetting the switch member to its circuit-closing position, subject to temperature responsive control of the thermostatic element. Thus in the combination with a humidifier, upon replenishing the water in the humidifier, the circuit-closing switch is thus manually reset.

A further embodiment of my invention resides in combinedly employing the resetting means as a circuit-opening means, thus affording the employment of such embodiment of my invention as a control switch of the electrical heating element, and obviating the use of a regulation opening and closing switch.

In the accompanying drawings,

Fig. 1 is an elevation of a radiator having my improved humidifying device attached thereto, such humidifying device being shown in elevation, and partly in section;

Fig. 2 is a central longitudinal sectional elevation of the lower part of the humidifying device shown in Fig. 1;

Fig. 3 is a sectional elevation on the line 3—3 of the Fig. 2;

Figure 4:
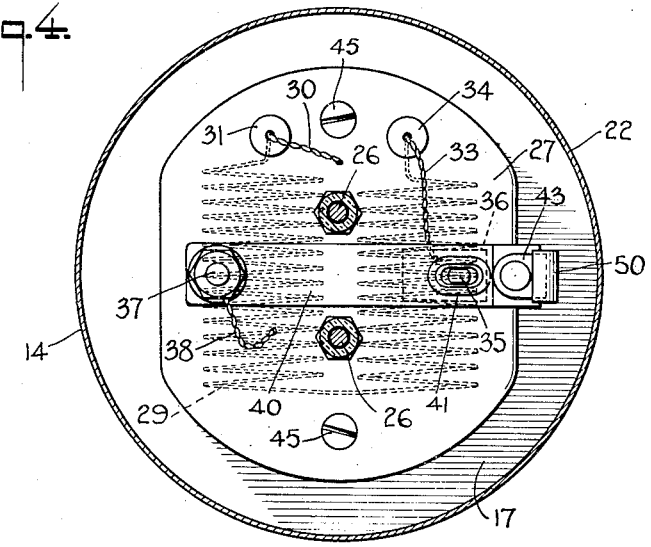
Fig. 4 is a section taken on the line 4—4 of Fig. 2.

Referring to the drawings, 10 designates a radiator of the usual type, in the present instance a radiator in a steam heating system, in which the steam passes from a pipe 11 through a manually controlled valve 12 into the radiator 10. Associated with such radiator is a humidifying unit 13, such unit consisting of a cylindrical member 14 of any desired diameter and length, preferably open at the top end, and closed at such end by a removable perforated cover 15. Intermediate of the upper and lower ends of the cylindrical member 14, but adjacent to the lower end, is a circumferential indented groove 16 which forms a limiting seat or stop for a cup-shaped bottom member 17, forming a water-tight bottom for the cylindrical member 14.

Entering the cylindrical member 14, at a point adjacent to the top end thereof, is a tube 18, which enters the cylindrical member 14 and adjacent to the bottom member 17, is a tube 19. The tube 18 is connected to the radiator at a point intermediate to its top and bottom ends. The tubes 18 and 19 are connected to a vertically arranged cylindrical tubular member 20, and therefore it will be evident that as steam or water circulates in the radiator 10 that such steam or water will likewise circulate through the pipes 18 and 19 and the cylindrical tubular member 20. Mounted on the tubular member 20 are the fins 21 and it is obvious therefore, that any heat delivered to the tubular member 20 by the steam or hot water circulating in the radiator 10 will be dissipated by the fins 21.

When in service the tubular member 14 is filled with water or other suitable liquid, and therefore the heat units radiated by the fins 21 are utilized as a means for heating the water or other liquid within the tubular member 14 and such heated water in the form of vapor passes into the room in which the humidifying unit is located, through the holes in the perforated cover 15.

When the radiator 10 is not in service, and it is desirable to supply moisture to a room or other enclosure in order to properly humidify the air therein, or where there is not enough heat supplied by the radiator 10 to properly heat the water within the cylindrical member 14, the supply of heat is had by the electrical heating element, combined with my thermostatic control, as appears more fully hereinafter.

Referring specifically to Figs. 2 and 4 it will be noted that cylindrical member 14 may extend downwardly beyond the circumferential indented groove 16, such extension being designated by the reference numeral 22, and the lower end of the member 22 is inwardly extended, i. e., flanged, as shown in Fig. 2. The member 22 and the bottom plate 17 define a chamber in which is housed my thermostatic control.

Forming part of my thermostatic control is a preferably substantially cylindrical plate or disc 24 provided with spaced circumferentially arranged holes through which pass screws 25 that engage with threaded holes formed in the inwardly extended flange 23, and therefore such plate or disc 24 forms a closure for the chamber above referred to.

Secured to the plate 24 but spaced apart from and parallel to each other, are posts 26, and secured to the upper ends of these posts is a cup-shaped member 27. Mounted insulatedly within the cup-shaped member 27 is a heating unit 28.

Such heating unit 28 has as a necessary element, the heating coil 29, and to one end of such heating coil is connected a conductor 30 which passes downwardly through an insulating member 31 secured in the cup member 27. The other end of the conductor 30 is electrically connected to a member 32, secured to, but insulated from, the plate or disc 24. The other end of the heating coil 29 has attached thereto one end of a conductor 33. This conductor passes through a block of insulating material 34 mounted on the cup-shaped member 27. The other end of the conductor 33 is attached to a terminal member 35 that is secured to, but insulated from, the cup-shaped member 27. Also mounted on the terminal 35 is a spring 36, the end of such spring being slotted to allow passage therethrough of the end of the terminal 35, as shown in Fig. 3. Mounted on the cup-shaped member 27, but insulated therefrom, is a connecting device 37. Attached to said device is one end of a conductor 38, the other end of this conductor being attached to a terminal member 39 which is mounted on the plate 24, but insulated therefrom. The terminal member 39 is arranged spaced apart from but parallel to the similar terminal member 32 above described.

Secured to the member 37 is one end of a spring switch blade 40. Such spring switch blade 40 extends in the direction of and slightly beyond the terminal member 35, and has formed in that portion adjacent to the member 35 a slot in which is placed the eyelet 41. The free end of the spring switch blade 40 is enveloped in a U-shaped member 42 of insulating material, and such U-shaped member 42 is kept in position by a metallic clip 43.

The heating element 28 has as a component part, a plate 44 provided with threaded perforations through which extends screws 45, and which screws hold the heating unit 28 in position within the cup-shaped member 27. The above structure is preferably mounted on the upper face of the disc 24 as a unit, and when such disc 24 is secured to the inwardly extending flange 23, the top face of the plate 44 is held in engagement with the under face of the cup-shaped member 17. Secured to the upper face of the member 44 by screws 47 is a thermostatic control such as a thermostatic bimetallic element which is therefore electrically insulated from the electrically energized parts. Such thermostat element comprises the horizontally arranged portion 48, the downwardly extending portion 49 and the inwardly and upwardly extending portion i. e., detent 50, such detent portion 50 engaging with the insulated clip 43 to hold the spring switch blade 40 in engagement with the contact terminal 35 and the spring member 36. Accordingly, the thermostat element is at all times effectually insulated electrically from the electrically energized parts, and is rendered responsive solely to the temperature conditions of the interior of the casing sought to be controlled.

Figure 5:
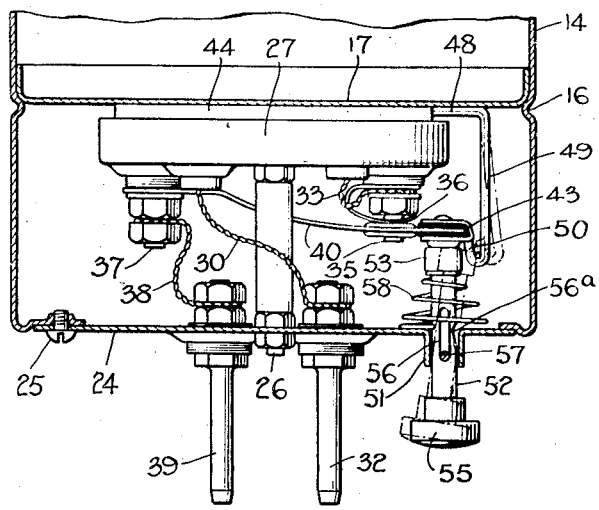
Fig. 5 is a sectional elevation similar to Fig. 2 and showing a modification of the manual controlling device for the switching plate.

As the temperature of the thermostatic element is elevated the lower end of its downwardly extended portion 49 moves outwardly, as viewed in Figs. 2 and 5, until at the set maximum temperature it assumes the dotted position shown in Fig. 5, whereupon it releases the spring contact blade 40 which by reason of its natural resiliency, preferably enhanced by the resiliency of the spring 36, the contact blade 40 is snapped out of engagement with the terminal 35, indicated in Fig. 2 respectively by full outline of switch 40 and its dot and dash outline, thereby breaking the circuit of the heating coil 29.

For re-setting the spring contact blade 40 to its normal operative position, as embodied in the form in my invention shown in Fig. 2, I provide a bearing member 51 mounted on the outer face of the plate 34, and in such bearing member I have arranged for axial movement a plunger 52. This plunger on its inner end is provided with an enlarged head 53, and between the enlarged head 53 and the inner face of the plate 24 is arranged an expansile coil spring 54 tending normally to keep its head 53 in engagement with the switch blade 40, i. e., its clip 43.

Attached to the outer end of the plunger 52 is a manipulating button or head 55 for moving the plunger 52 axially to re-set the switch blade 40 in its circuit-closing position, effective upon cooling off of the thermostatic member, and desirable after replenishing water in the humidifier or equivalent condition of any other device with which my thermostatic control is associated.

The embodiment shown in Fig. 5 includes a re-setting device which operates similar to the re-setting device above described with reference to Fig. 2, but which functions additionally as a circuit opening and closing device or switch of the electrical circuit of the heating means, thus obviating the necessity of a regulation electrical switch for the circuit of the electrical heating means. For such additional function, I provide the plunger 52 with a limiting axially extending closed ended slot 56 through which extends a pin 57 secured at its opposite ends in the bearing 51, the body of the plunger 52 being cut away as indicated at 56a, namely on the side of the body of the plunger 52 at which the end 50 of the thermostatic element is located, to afford a rocking movement of the plunger 52 toward and away from the stated end 50, manipulated manually by sidewise movement of the button 55 of the plunger 52, as indicated by its dot and dash outline in Fig. 5.

I further provide the plunger 52 with a self-centering expansile spring 58, shown of frusto-conical configuration, positioned between the upper face of the carrier plate 24 and the enlarged head 53 of the plunger, whereby the plunger is normally positioned substantially at right angles to the switch blade 40.

Accordingly, to close the circuit of the electrical heating coil, the plunger 52 is pushed axially to reset the switch blade 40 in its circuit-closing position with the terminal 35. In the circumstance of attainment of maximum temperature condition, the end 50 of the thermostatic element releases the switch blade 40, to interrupt the circuit through the heating coil, similarly as above stated. However, when it is desired to manually interrupt the circuit through the heating coil, the manipulating button 55 is grasped, and therewith the plunger 52 is rocked in proper direction to mechanically release the end 50 of the thermostatic element and in turn to release the switch plate 40.

Whereas I have described my invention by reference to specific forms thereof, it will be understood that many changes and modifications may be made without departing from the spirit of the invention.

I claim:

1. A unitary circuit control device, the combination of a supporting member, electrical terminals insulatedly mounted on said supporting member, an electrical heating element, a casing insulatedly carrying said electrical heating element, electrical contacts respectively connected to said heating element and insulatedly mounted on said casing, an electrical switch member secured to one of said electrical contacts and arranged to engage and disengage the other of said electrical contacts, thermostatic means, means for mounting one end of said thermostatic means in direct relationship with said casing, the other end of said thermostatic means being free, electrically insulating means arranged to be interposed between the free end of said thermostatic means and said electrical switch member, and manually operable means effecting displacement of the free end of said thermostatic means for effecting movement of said electrical switch member to its circuit-opening position.

2. A unitary circuit control device, the combination of a supporting member, electrical terminals insulatedly mounted on said supporting member, an electrical heating element, a casing insulatedly carrying said electrical heating element, electrical contacts respectively connected to said heating element and insulatedly mounted on said casing, an electrical switch member secured to one of said electrical contacts and arranged to engage and disengage the other of said electrical contacts, thermostatic means, means for mounting one end of said thermostatic means in direct relationship with said casing, the other end of said thermostatic means being free, electrically insulating means arranged to be interposed between the free end of said thermostatic means and said electrical switch member, and manually operable means for optionally displacing the free end of said thermostatic means to effect movement of said electrical switch member to its circuit-opening position and for resetting said electrical switch member to its circuit-closing position.

EDWARD S. CORNELL, Jr.